(12) United States Patent
Lin

(10) Patent No.: US 8,701,254 B2
(45) Date of Patent: Apr. 22, 2014

(54) CLAMP STRUCTURE

(75) Inventor: Chih-Hsin Lin, Chang Hwa (TW)

(73) Assignee: K.S. Terminals Inc., Chang Hwa (TW)

( * ) Notice: Subject to any disclaimer, the term of this patent is extended or adjusted under 35 U.S.C. 154(b) by 88 days.

(21) Appl. No.: 13/019,551

(22) Filed: Feb. 2, 2011

(65) Prior Publication Data

US 2012/0151721 A1 Jun. 21, 2012

(30) Foreign Application Priority Data

Dec. 15, 2010 (TW) ................................ 99224371 U

(51) Int. Cl.
*F16B 2/24* (2006.01)

(52) U.S. Cl.
USPC ............................... 24/546; 24/336; 24/563

(58) Field of Classification Search
USPC ........... 24/335, 336, 545, 460, 462, 339, 546, 24/457, 561, 563, 564; 403/397
See application file for complete search history.

(56) References Cited

U.S. PATENT DOCUMENTS

| 6,438,804 | B1 * | 8/2002 | Romero Magarino | 24/289 |
| 8,220,827 | B2 * | 7/2012 | Schirm | 280/728.2 |
| 2009/0205174 | A1 * | 8/2009 | Slobodecki et al. | 24/458 |
| 2010/0200206 | A1 * | 8/2010 | Mandrone et al. | 165/185 |
| 2011/0156377 | A1 * | 6/2011 | Slobodecki et al. | 280/728.2 |

* cited by examiner

*Primary Examiner* — Robert J Sandy
*Assistant Examiner* — Michael Lee
(74) *Attorney, Agent, or Firm* — Bacon & Thomas, PLLC

(57) ABSTRACT

A clamp structure includes a base plate, a pair of first jaws, and a pair of second jaws. The first jaws extend respectively from two sides of the base plate in a face-to-face manner and form a first jaw opening at their ends. The first jaws are also formed with a pair of cutouts that face each other. The second jaws extend respectively from the pair of cutouts towards the base plate and form a second jaw opening at their ends. Each second jaw has a hook-shaped configuration composed of a first arc near the second jaw opening and a second arc away from the base plate, wherein the first arc has a greater curvature than the second arc. A junction box and a solar panel which are bonded together can be inserted into and thus clamped by the clamp structure so as to be secured against lateral shifting.

10 Claims, 3 Drawing Sheets

CLAMP STRUCTURE

BACKGROUND OF THE INVENTION

1. Technical Field

The present invention relates to a clamp structure and, in particular, to a clamp structure used in a solar cell.

2. Description of Related Art

With an increasing shortage of modern energy, the development of new energy sources—such as the solar cell—has drawn great attention from the international community. The solar cell has a plurality of advantages such as environmental friendliness, energy saving, and a wide application range. Also, the solar cell technology is currently more mature than any other alternative energy technologies. Nowadays, the improvement of solar cell performance has become a common goal in the industry. In order to achieve that goal, it is important to draw electricity out of the solar cell efficiently. In general, the electricity generated by a solar cell is led out of the solar cell by a conductive ribbon, and a junction box is usually used to keep the conductive ribbon firmly connected to other power transmission lines. The conductive ribbon is firmly connected to the terminals in the junction box, before the terminals are connected to the power transmission lines to output electricity. As such, it is critical to connect the junction box to the solar panel stably and securely.

Conventionally, a junction box and a solar panel that have been bonded with an adhesive will not be configured on a support until the adhesive is completely cured, and the most frequently used adhesive is silicone, which, due to its advantageous feature of being highly resistant to both heat and cold, has broad industrial applications, particularly in sealing or bonding objects. In case of a solar cell, silicone is used to bond a junction box to a solar panel not only to enhance the connection stability of the junction box and its terminals, but also to ensure the normal function and service life of the solar cell.

However, the silicone used to bond the junction box and the solar panel takes at least half a day to a day to become completely cured. During the long bonding and curing process, the connected portions of the junction box and the solar panel may shift because of an external force or gravity any time before the adhesive is cured. The shifting may cause the connection between the conductive ribbon and the junction box to loosen, which is detrimental to power transmission. In the worst case, the shifting may cause malposition of the connected portions and compromise the power transmission function of the solar panel such that the solar panel cannot be used normally. Hence, it is extremely important to securely maintain the relative positions of the junction box and the solar panel.

In view of the above, it is a goal of research and development in the relevant industry to overcome the shortcomings of the prior art and to provide a means for connecting a junction box and a solar panel with increased convenience and higher efficiency.

BRIEF SUMMARY OF THE INVENTION

To overcome the foregoing technical shortcomings of the prior art, the present invention provides a clamp structure comprising a base plate, a pair of first jaws, and a pair of second jaws. The pair of first jaws extend from two sides of the base plate respectively, are opposite each other, and form a first jaw opening at their ends. Also, the pair of first jaws form a pair of cutouts that face each other. The second jaws extend respectively from the pair of cutouts towards the base plate and form a second jaw opening at their ends. Each of the second jaws forms a first arc near the second jaw opening and a second arc away from the base plate, wherein the curvature of the first arc is greater than that of the second arc.

The primary objective of the present invention is to provide the foregoing clamp structure, wherein each second jaw forms the first arc near the second jaw opening and the second arc away from the base plate, the first arc having a greater curvature than the second arc. The curvatures of the first arc and the second arc of each second jaw are so designed that, when a junction box and a solar panel that are bonded together enter the interior of the clamp structure from the first jaw opening through the gap between the first jaws, the second jaws are guided into secure engagement with recesses of the junction box, thereby fixing the junction box laterally in position. Consequently, both the junction box and the solar panel are prevented from being shifted by an external force during the bonding process, and the stability of connection between the junction box and the solar panel is enhanced, which helps increase the yield rate of the solar panel.

Another objective of the present invention is to provide the foregoing clamp structure wherein, with each second jaw forming the first arc near the second jaw opening and the second arc away from the base plate, and with the first arc having a greater curvature than the second arc, the second jaws each have a hook-shaped configuration that is formed by the first and the second arcs. The hook-shaped configuration allows the second jaws to be easily guided into or out of secure engagement with the recesses of the junction box. Thus, not only can the clamp structure be conveniently installed or removed, but also the risk of junction box damage is reduced.

An additional objective of the present invention is to provide the foregoing clamp structure wherein, with each second jaw forming the first arc near the second jaw opening and the second arc away from the base plate, and with the first arc having a greater curvature than the second arc, the second jaws each have a hook-shaped configuration that is formed by the first and the second arcs and allows the second jaws to be guided into secure engagement with the recesses of the junction box when the junction box and the solar panel that are bonded together enter the interior of the clamp structure from the first jaw opening through the gap between the first jaws. Once the second jaws are securely engaged with the recesses, the junction box is fixed laterally in position, thereby preventing both the junction box and the solar panel from being shifted by an external force during the bonding process. Thus, the connection stability of the junction box and the solar panel is enhanced to ensure normal power output from the solar cell.

Yet another objective of the present invention is to provide the foregoing clamp structure wherein, with each second jaw forming the first arc near the second jaw opening and the second arc away from the base plate, and with the first arc having a greater curvature than the second arc, the second jaws each have a hook-shaped configuration that is formed by the first and the second arcs and allows the second jaws to be guided into secure engagement with the recesses of the junction box when the junction box and the solar panel that are bonded together enter the interior of the clamp structure from the first jaw opening through the gap between the first jaws. Once the second jaws are securely engaged with the recesses, the junction box is fixed laterally in position, thereby preventing both the junction box and the solar panel from being shifted by an external force during the bonding process. Thus, the connection stability of the junction box and the solar panel is enhanced, the possibility of solar cell maintenance reduced, and the service life of the solar cell extended. This further decreases the overall cost and increases productivity.

DETAILED DESCRIPTION OF THE INVENTION

The present invention discloses a clamp structure wherein the clamping method employed is understandable to people of ordinary skill in the art and therefore is not described in detail herein. Also, the drawings referred to in the following description only schematically depict structures related to the technical features of the present invention and hence are not, and need not be, drawn to scale.

Figure 1:
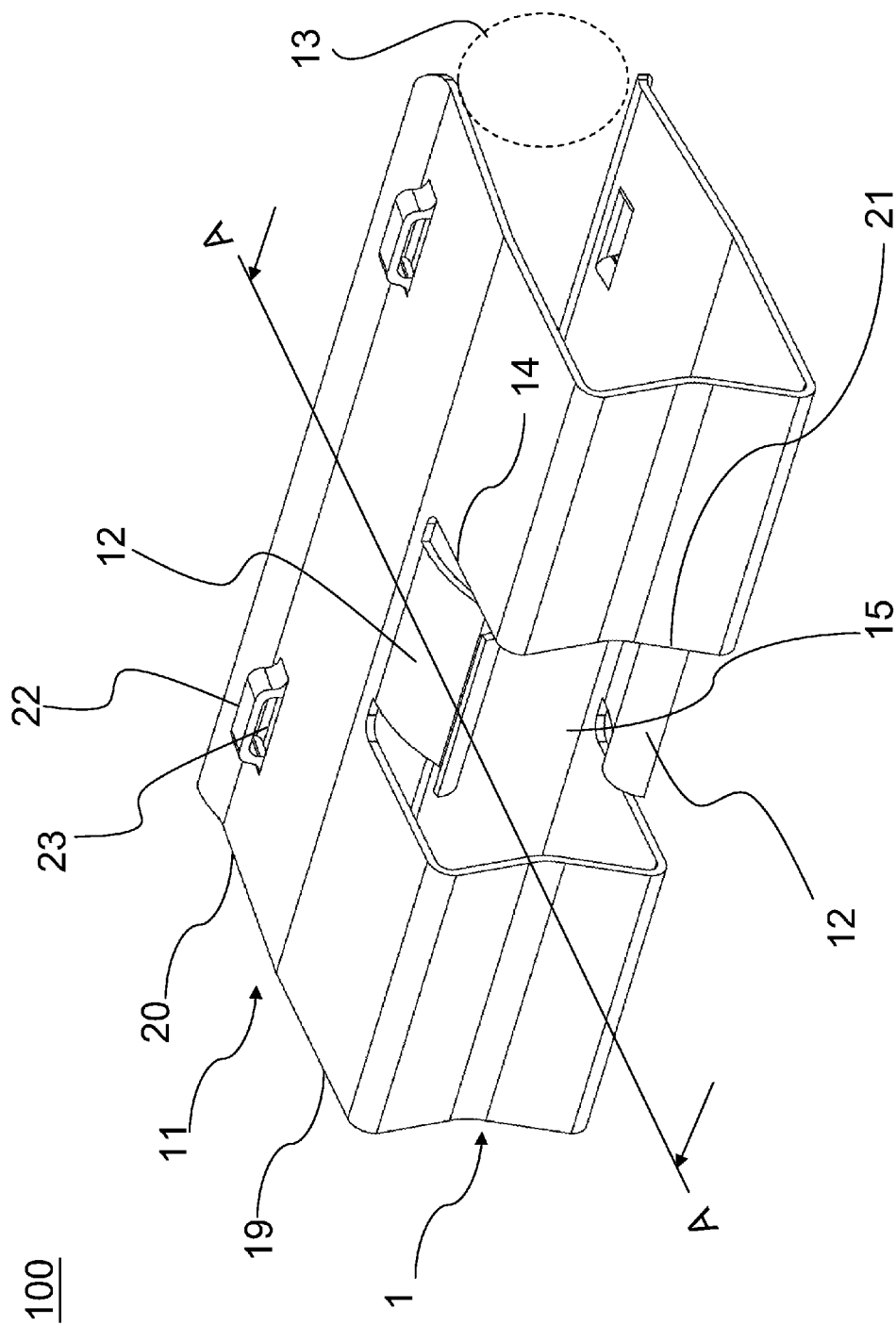
FIG. 1 is a schematic perspective view of the clamp structure in accordance with the first preferred embodiment of the present invention.
Figure 2:
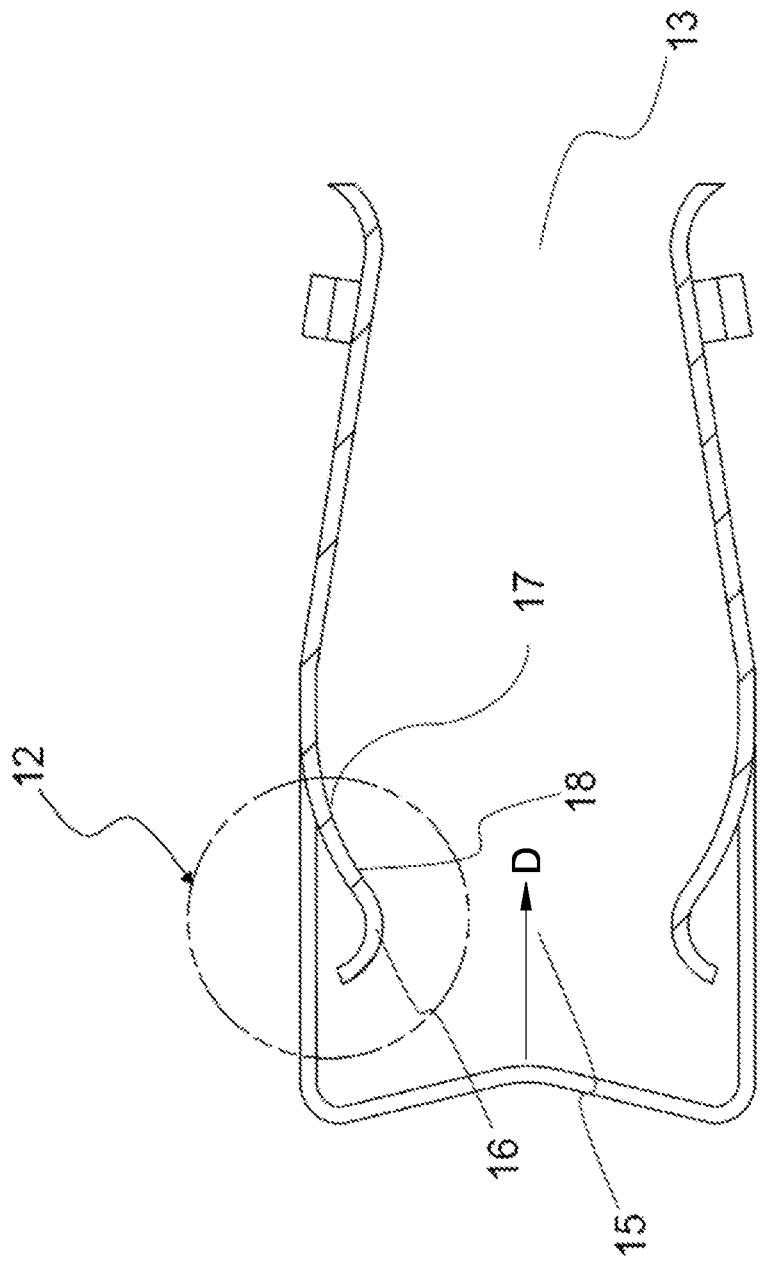
FIG. 2 is a cross-sectional view taken along line AA of FIG. 1.

Referring to FIGS. 1 and 2, a clamp structure 100 in accordance with the first preferred embodiment of the present invention includes a base plate 1, a pair of first jaws 11, and a pair of second jaws 12. The pair of first jaws 11 extend from two sides of the base plate 1 respectively in a face-to-face manner such that the ends of the first jaws 11 form a first jaw opening 13. Also, the pair of first jaws 11 are formed with a pair of cutouts 14 in a face-to-face manner. The second jaws 12 stem from the pair of cutouts 14 respectively and extend towards the base plate 1; as a result, the ends of the second jaws 12 form a second jaw opening 15. Each of the second jaw 12 forms a first arc 16 near the second jaw opening 15 and a second arc 17 away from the base plate 1, wherein the curvature of the first arc 16 is greater than that of the second arc 17. Thus, each second jaw 12 has a hook-shaped configuration formed by the first arc 16 and the second arc 17, by the hook-shaped configuration of the second jaws 12. When a junction box 200 and a solar panel 300 that are bonded together enter the interior of the clamp structure 100 from the first jaw opening 13 through the gap between the first jaws 11, the second jaws 12 are guided into recesses of the junction box 200. In consequence, the junction box 200 is secured laterally in position. Because of that, both the junction box 200 and the solar panel 300 are less likely to be shifted by an external force during the bonding process, and the power transmission function is protected from damage which may otherwise occur if the connection between the junction box 200 and the solar panel 300 gets loose. The stability of the resultant solar cell is also increased.

The hook-shaped configuration of each second jaw 12 results from a negative inner product of the curvature vectors of the first arc 16 and the second arc 17. This configuration allows the second jaws 12 to be easily guided into secure engagement with the recesses of the junction box 200. The curves of the hook-shaped configuration also facilitate the installation and removal of the clamp structure 100 and reduce the risk of damaging the junction box 200.

The first arc 16 and the second arc 17 of each second jaw 12 can be directly connected to each other, connected by an extension section 18, or connected by other means capable of producing the same securing effect, depending on product installation and mounting requirements. Each first jaw 11 includes a horizontal section 19 connected to the base plate 1. The horizontal sections 19 of the pair of first jaws 11 are parallel to each other along a direction D from the base plate 1 to the first jaw opening 13 (as shown in FIG. 2). Moreover, each first jaw 11 includes a sloped section 20 configured between the horizontal section 19 and the first jaw opening 13. The sloped sections 20 of the pair of first jaws 11 are tilted towards each other along the direction D. With the paired horizontal sections 19 connected with the paired sloped sections 20 to create a taper configuration, the sloped sections 20 can exert pressure on the object being clamped, and it is this pressure that secures the junction box 200 and the solar panel 300 vertically in the clamp structure 100 during the bonding process.

The openness of the first jaw opening 13 is virtually the same as that of the second jaw opening 15, which makes it easy for the junction box 200 and the solar panel 300 to enter the clamp structure 100. An opening 21 is further formed in the base plate 1 and communicates with the pair of cutouts 14. The opening 21 allows an operator to see from the outside whether the conductive ribbon and the second jaws 12 are truly secured. In addition, each of the first jaws 11 is formed with at least one positioning structure 22 near the first jaw opening 13. Each positioning structure 22 forms a through-hole 23 oriented in the direction in which the first jaws 11 extend. The positioning structures 22 work in conjunction with an installation tool to facilitate pulling the first jaws 11 apart. More specifically, the operator can insert the actuation portions of the installation tool into the through-holes 23 and pull the first jaws 11 open with the installation tool. By doing so, the junction box 200 and the solar panel 300 are allowed easy entry into the clamp structure 100 without being scratched or otherwise damaged. The positioning structures 22 may face or not face each other or have other configurations capable of providing the aforesaid function. The configuration of the positioning structures 22 may vary with product installation and the requirements of the installation tool.

Figure 3:
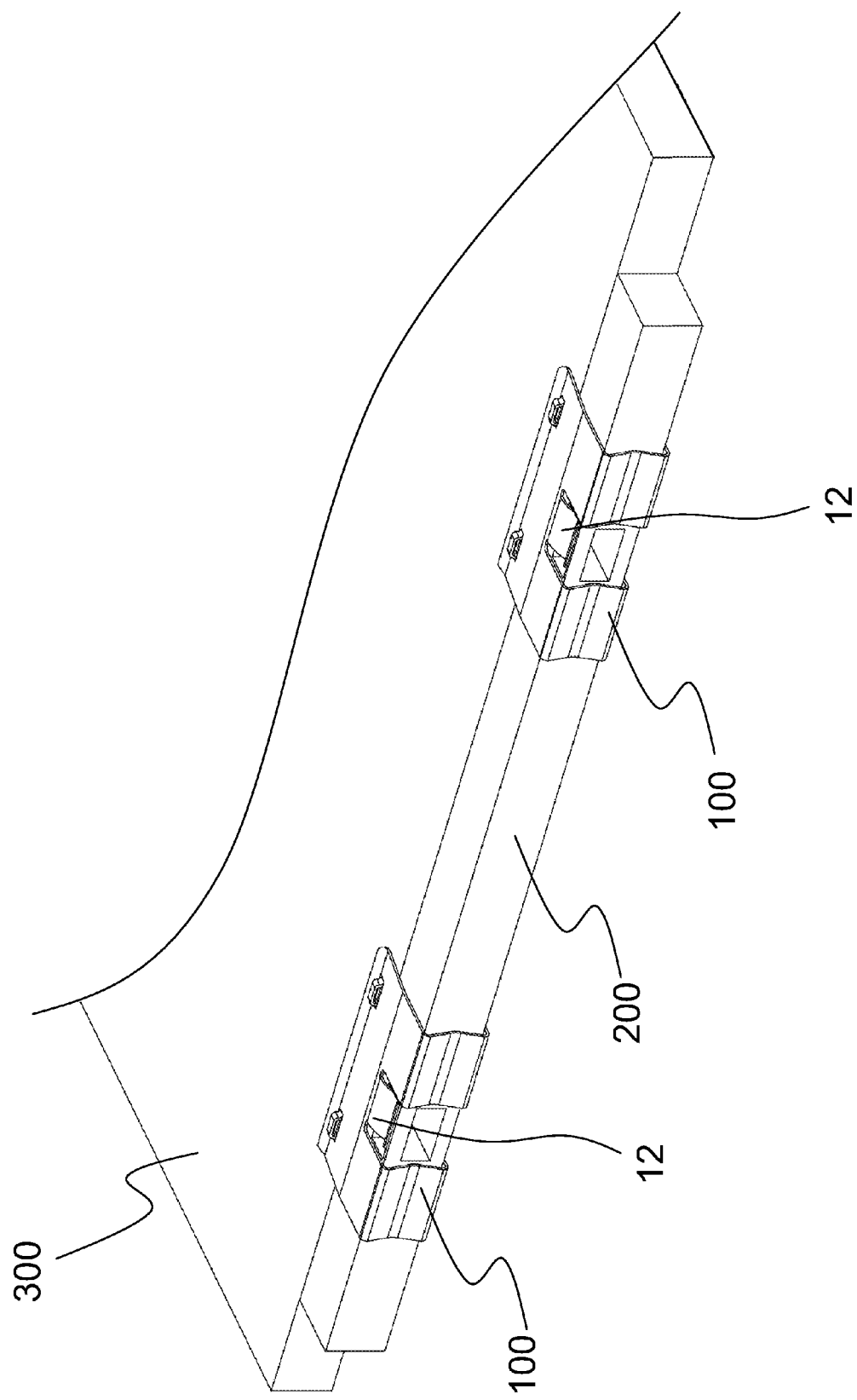
FIG. 3 is another schematic perspective view of the clamp structure in accordance with the first preferred embodiment of the present invention, wherein two such clamp structures are used to clamp a junction box.

Please refer to FIG. 3 for a schematic view of two clamp structures 100 clamping the junction box 200. Once the junction box 200 and the solar panel 300 that are bonded together are inserted into the clamp structures 100 and clamped thereby, the second jaws 12 secure the junction box 200 laterally in position. As a result, both the junction box 200 and the solar panel 300 are prevented from being shifted by an external force during the bonding process.

In summary, the clamp structure proposed by the present invention is structurally simple and is effective in clamping the junction box and the solar panel securely as well as preventing them from being shifted laterally. By contrast, if a conventional clamp structure is used, the connected portions of the junction box and the solar panel are subject to lateral shifting during the long hours in which the adhesive is gradually cured. Should such lateral shifting occur, the connection between the junction box and the solar panel may loosen and thus impair power transmission. In the worst case, a misposition of the connected portions may take place, thus affecting the power transmission function and service life of the solar panel. Hence, the present invention not only can ensure the power transmission function of the solar panel and save maintenance and installation costs, but also facilitate the installation and removal of the clamp structure and reduce the risk of junction box damage, thereby lowering the overall cost while increasing productivity.

What described above is only the preferred embodiment of the present invention and is not intended to confine the scope of the present invention. Moreover, as the above description shall be understandable to and can be implemented by people of ordinary skill in the art, any equivalent variations or modifications which do not depart from the spirit of the present invention should be encompassed by the appended claims.

What is claimed is:

1. A clamp structure, comprising a base plate (1), a pair of first jaws (11), and a pair of second jaws (12), wherein the pair of first jaws (11) extend respectively from two opposite sides of the base plate (1) in a face-to-face manner, have ends forming a first jaw opening (13), and are formed with a pair of cutouts (14) in a face-to-face manner, and the pair of second jaws (12) extend respectively from the pair of cutouts (14) towards the base plate (1) and have ends forming a second jaw opening (15), the clamp structure being characterized in that:

the base plate has an opening extending between the two opposite sides and continuous with the pair of cutouts to allow the second jaw opening to be exposed in a view opposite the first jaw opening, and each said second jaw has a hook-shaped configuration.

2. The clamp structure of claim 1, wherein an extension section (18) is provided between the first arc (16) and the second arc (17) of each said second jaw (12).

3. The clamp structure of claim 1, wherein each said first jaw (11) comprises a horizontal section (19) connected to the base plate (1), and the horizontal sections (19) of the pair of first jaws (11) are parallel to each other along a direction from the base plate to the first jaw opening.

4. The clamp structure of claim 3, wherein each said first jaw (11) comprises a sloped section (20) provided between the horizontal section (19) and the first jaw opening (13), and the sloped sections (20) of the pair of first jaws (11) are tilted towards each other along the direction from the base plate to the first jaw opening.

5. clamp structure of claim 1, wherein the first jaw opening (13) has a substantially same openness as the second jaw opening (15).

6. The clamp structure of claim 1 or 4, wherein each said first jaw (11) is further formed with at least a positioning structure (22) near the first jaw opening (13), and each said positioning structure (22) forms a through-hole (23) oriented in a direction in which the first jaws (11) extend.

7. The clamp structure of claim 6, wherein the at least a positioning structure (22) of each said first jaw (11) faces each other.

8. The clamp structure of claim 1, wherein each said second jaw forms a first arc near the second jaw opening and a second arc away from the base plate, the first arc has a greater curvature than the second arc.

9. The clamp structure of claim 8, wherein an inner product of a curvature vector of the first arc (16) and a curvature vector of the second arc (17) of each said second jaw (12) is a negative value.

10. The clamp structure of claim 8, wherein the first arc (16) and the second arc (17) of each said second jaw (12) are directly connected.

* * * * *